United States Patent [19]
Peltier

[11] Patent Number: 5,490,176
[45] Date of Patent: Feb. 6, 1996

[54] DETECTING FALSE-LOCKING AND COHERENT DIGITAL DEMODULATION USING THE SAME

[75] Inventor: Jacques Peltier, Paris, France

[73] Assignee: Societe Anonyme Dite: Alcatel Telspace, Nanterre Cedex, France

[21] Appl. No.: 963,559

[22] Filed: Oct. 20, 1992

[30] Foreign Application Priority Data

Oct. 21, 1991 [FR] France .................................. 91 12964

[51] Int. Cl.$^6$ ................................................. H04L 1/00
[52] U.S. Cl. ...................... 375/325; 375/326; 375/327; 375/344; 375/345; 329/308
[58] Field of Search ...................... 375/324–328, 375/344, 345; 329/304, 306–310; 348/528, 536

[56] References Cited

U.S. PATENT DOCUMENTS

| | | | |
|---|---|---|---|
| 4,546,322 | 10/1985 | Crutcher | 329/308 |
| 4,726,043 | 2/1988 | Levesque | 375/343 |
| 4,871,973 | 10/1989 | Yoshihara | 375/327 |
| 4,940,951 | 7/1990 | Sakamoto | 329/307 |
| 4,977,580 | 12/1990 | McNicol | 375/344 |
| 5,025,455 | 6/1991 | Nguyen | 329/304 |
| 5,042,052 | 8/1991 | Roberts et al. | 375/344 |
| 5,170,415 | 12/1994 | Yoshida et al. | 375/326 |

OTHER PUBLICATIONS

IEEE Proceedings G. Electronic Circuits & Systems, vol. 138, No. 2, Apr. 1991, Stevenage, GB, pp. 205–209; P. V. Brennan: "Technique allowing rapid frequency sweeping in aided–acquision phase–locked loops."

IEEE Proceedings I. Solid–State & Electron Devices, vol. 137, No. 1, Feb. 1990, Stevenage, GB, pp. 25–32; P. B. Kenington et al.: "Novel acquisition–aid design for the split–loop phase–lock receiver."

Electronic Components and Applications, vol. 9, No. 2, 1989, Eindhoven, NL, p. 66–89; W. Rosink: "All–digital phase–locked loops using the 74HC/HCT297".

Primary Examiner—Young T. Tse
Attorney, Agent, or Firm—Sughrue, Mion, Zinn, Macpeak & Seas

[57] ABSTRACT

In a method of detecting false-locking the trains of clock signals corresponding to the two phase offset initially modulated trains of signals, the phase offset between said trains of clock signals is monitored, and false-locking is detected when the phase offset changes signal. Also, a method of demodulation implements this method of detecting false-locking. Also, a device for implementing the method of detecting false-locking contains a flip-flop in series with a monostable.

8 Claims, 3 Drawing Sheets

DETECTING FALSE-LOCKING AND COHERENT DIGITAL DEMODULATION USING THE SAME

BACKGROUND OF THE INVENTION

The present invention relates to a method of detecting false-locking of a reference signal, provided by a local receiver oscillator, onto a digitally quadrature modulated signal with multiple levels and phase offset, and to a method of coherent demodulation using this method of detecting false-locking. In one particular implementation of these methods it is possible to establish the phase of the carrier of the signal to be demodulated. The invention further relates to devices for implementing these methods.

One example of digital modulation with multiple levels and phase offset is quadrature phase-shift keying with phase offset, known as OQPSK (offset quadrature phase shift keying), in particular modulation by shifting phase, with phase offset, on two carriers, each at two levels, known as MDP4. In direct modulation at microwave frequencies, two bit streams phase offset in time are mixed with two microwave carriers in quadrature, then added and transmitted. The two carriers are provided from the same microwave oscillator.

On reception, the signal to be demodulated is filtered if need be, then mixed with two receiver carriers in quadrature, which are theoretically of the same frequency as the transmitter carriers and are in phase with the latter (coherent demodulation). The baseband signals are recovered at the outputs of the mixers and correspond to the initial bit streams.

To effect phase-lock of the receiver oscillator, carrier recovery systems are customarily used, such as conventionally the COSTAS loop and the LECLERT & VANDAMME loop. These loops are stable when the transmitter oscillator and the receiver oscillator are in phase. However, they also have other stable points. Thus the COSTAS loop is stable for:

$$F_{ole}-F_{olr}=\pm nD/4$$

and the LECLERT & VANDAMME loop is stable for $$F_{ole}-F_{olr}=\pm nD/(4.k),$$

where $F_{ole}$ and $F_{olr}$ are the frequencies of the local transmitter oscillator and the local receiver oscillator respectively, n and k are integers, and D is the symbol rate, that is to say the word rate on each channel.

When a point of stability is found at which the receiver frequency is different from the transmitter frequency, "false-locking" has occurred.

In practice, because of the high drift, especially with temperature, of the oscillators which are used (the drift even exceeding the bandwidth of the carrier recovery systems, which bandwidth is generally less than 300 kHz ), it is necessary for the receiver to incorporate a slow search device which uses a ramp to follow the frequency drift of the local receiver oscillator, especially its temperature drift.

Many devices are already known to effect detection of false-locking. In particular the applicants have proposed a method of detecting false-locking in their French patent application published under the No. 2 620 885, relying upon observation of the opening along the time axis of the eye diagram (the diagram observed on an oscilloscope synchronized by the clocks of the bit streams after recovering the baseband signal but before regeneration). When the carrier recovery loop is on a point of stability, the eye is open. However the opening of the eye along the time axis is smaller when false-locking occurs. That patent application proposes scrutinizing the eye to detect its closure.

Another system which is used is for the receiver to recognize a frame locking word. Such a system has some problems however. It necessitates the presence of a card for generating the frame locking word and of a card for recognizing the word. If either of the cards is omitted, detection is no longer provided. Furthermore, depending on the position of the bits of the locking word in the frame, it can happen that the locking word can be recovered at false-locking points.

SUMMARY OF THE INVENTION

The present invention proposes a method of detecting false-locking which is of a novel type and which serves, in particular, to mitigate the problems of systems for recognizing a locking word in radio links using digital modulation with multiple levels and phase offset. In some implementations, the method of detecting false-locking proposed by the invention also allows the phase of the carrier to be established modulo $\pi$.

The present invention thus provides a method of detecting false-locking of a reference signal on to a digitally quadrature modulated signal with multiple levels and phase offset and demodulated by coherent digital demodulation, in which:

trains of clock signals synchronous with baseband signals are recovered from said baseband signals, wherein:

the phase offset between said trains of clock signals is monitored and false-locking is detected when the phase offset is not of constant sign (direction).

The signal to be demodulated will have been mixed initially with two carriers in quadrature, corresponding in phase and frequency to the carriers transmitted by the transmitter local oscillator, in such a manner as to obtain the baseband bit stream signals. In the case of correct locking the phase offset between the trains of clock signals is constant.

The invention also provides a method of coherent digital demodulation of a signal initially digitally modulated with multiple levels and phase offset, in which:

said signal to be demodulated is mixed with two reference signals in phase quadrature in order to obtain baseband analog signals corresponding to the initial bit stream signals, the bit streams of the baseband signals thus obtained are regenerated, the reference signals are corrected when false-locking is detected, to lock them in frequency and phase with the signal to be demodulated, wherein false-locking is detected for this purpose by means of the method of detection recited above.

In an advantageous manner, the phase of the reference signal modulo $\pi$ is detected when the sign of the phase difference between the said clock signals takes a predetermined value.

The signal to be demodulated is preferably mixed with the reference signal and a signal in quadrature with the said reference signal, the trains of clock signals synchronized with the baseband signals thus obtained are recovered, the sign of the phase offset between the two trains of clock signals thus obtained is monitored, the in-phase reference signal is only corrected when the train of clock signals from the mixer mixing the signal to be demodulated with the reference signal is in advance (is delayed) relative to the train of clock signals obtained by mixing the signal in phase-quadrature with the reference signal with the signal to be demodulated, in such a manner that the carrier to which the reference signal is locked is established modulo $\pi$.

The invention further provides a device for implementing the method of detection recited above, including means adapted to detect changes in the sign (direction) of the phase offset between the clock trains.

The means preferably comprise a flip-flop receiving the train of clock signals of one demodulation channel on its clock input and receiving the train of clock signals of another channel on another input, and a monostable circuit receiving as its input the output signal of the said flip-flop.

The flip-flop may in particular be a D-type flip-flop.

The invention further provides a device for implementing the aforesaid method of demodulation, comprising a direct demodulation circuit for mixing the signal to be demodulated with signals corresponding in frequency and phase with the reference signal, said demodulation circuit comprising a receiver oscillator providing the reference signal, the different output channels of the demodulation circuit each being connected firstly to a clock recovery circuit and secondly to a regenerating sampler with two inputs, of which one receives the signal provided by said demodulation circuit channel and of which the other receives the clock signal at the output of the clock recovery circuit, said device further comprising a carrier recovery circuit and a voltage ramp circuit, slaving said receiver oscillator to control its phase and frequency respectively, further comprising a device for detecting false-locking of the type recited above, the carrier recovery circuit and/or the voltage ramp circuit being controlled as a function of the output information from this device.

The device advantageously comprises means for enabling the carrier recovery device, these means only enabling said carrier recovery device when the signal at the output of the flip-flop assumes a predetermined value.

BRIEF DESCRIPTION OF THE DRAWINGS

Embodiments of the invention are described by way of example with reference to the accompanying drawings, in which.

DETAILED DESCRIPTION

Figure 1:
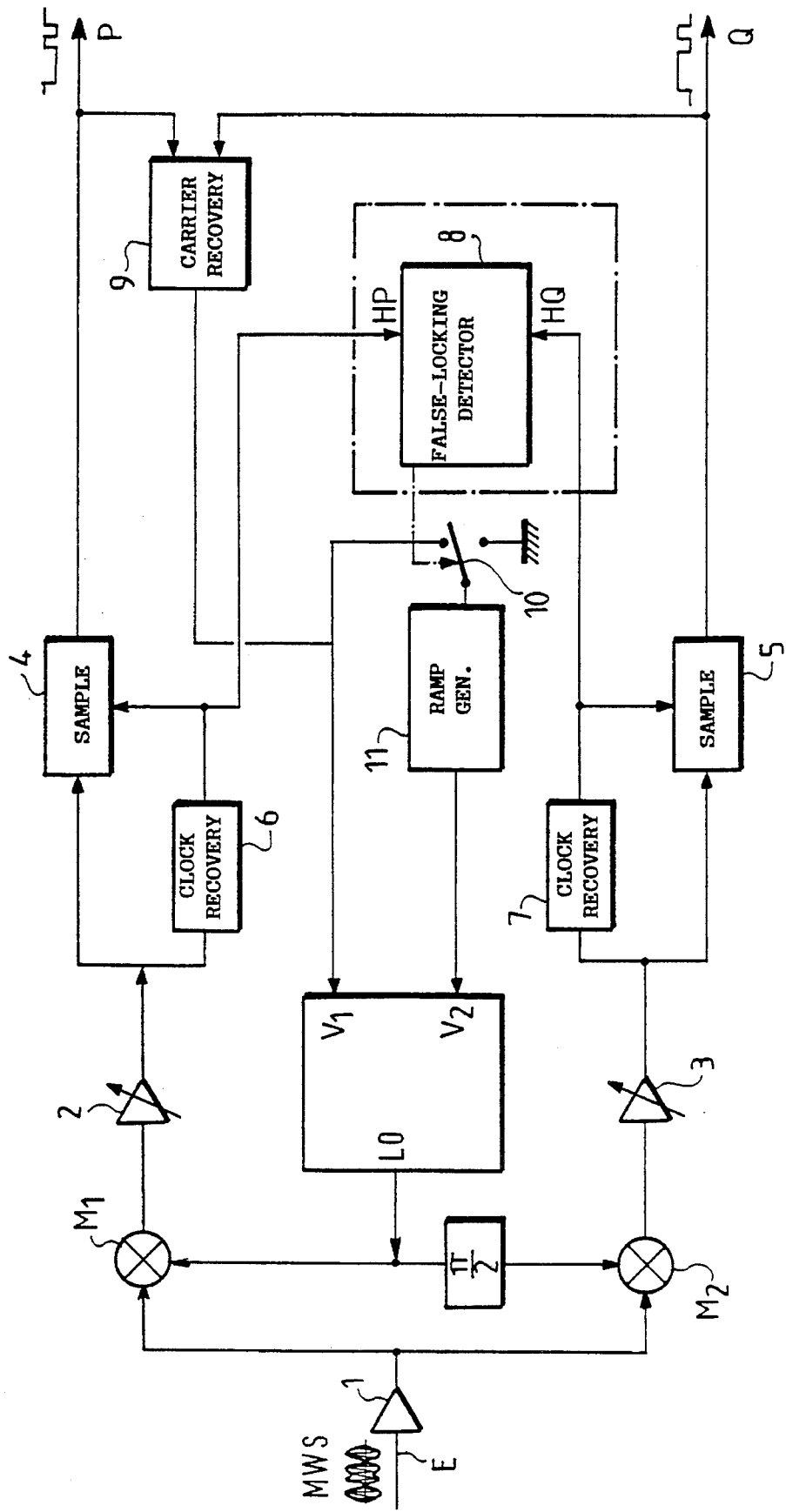
FIG. 1 is a schematic diagram of a demodulation device implementing a method of detecting false-locking in conformity with the invention.

Referring to FIG. 1, the receiver and detection device shown receives a microwave signal MWS at its input E, the signal being formed, as has been indicated above, from two carriers in phase quadrature, modulated by two synchronous phase offset digital signals and providing a modulated signal with four phase states.

The receiver device principally comprises a local receiver oscillator LO, which generates two orthogonal carriers, and two linear mixers $M_1$ and $M_2$. The mixers $M_1$ and $M_2$ each receives as an input the microwave signal MWS at the output of an input filter 1 and respective ones of the two carriers generated by the local oscillator LO. At their outputs the mixers $M_1$ and $M_2$ are connected to inputs of various circuits processing the baseband signal, represented in the figure by automatic gain-controlled amplifiers 2 and 3 respectively.

The output signal of each of these processing circuits 2 and 3 is then fed firstly to a respective regenerating sampler 4 or 5 and secondly to a respective clock recovery circuit 6 or 7 for recovery of the reference clock.

The regenerated signals P and Q appear at the outputs of the regenerating samplers 4 and 5. These signals P and Q correspond to the initial phase offset binary signals.

Clock signals HP and HQ corresponding to the signals P and Q are produced at the clock outputs of the clock recovery circuits 6 and 7 respectively. Each such signal HP, HQ is applied to a second input of the corresponding regenerating sampler 4, 5 and also to one of two inputs of a false-locking detector device 8 common to the two channels for detecting false-locking.

The signals P and Q are themselves fed to the outputs of the reception and demodulation device as well as to respective ones of two inputs to a common carrier recovery device 9. This device forms a loop with the remainder of the reception and demodulation device, namely a fast loop such as a COSTAS loop or a LECLERT & VANDAMME loop, whose output applies an input voltage $V_1$ to the oscillator LO.

The device 8 detecting false-locking controls the changeover of a switch 10 connected to the input of a ramp voltage generator 11 slaving at its output a second input voltage $V_2$ for the oscillator LO, in order to form a slow voltage ramp loop. The switch 10 connects the input to the generator 11, creating the voltage ramp, either to ground or to the output voltage of the carrier recovery device 9, depending on the switch position. As a result and depending on the position of the switch 10, the frequency of the receiver oscillator LO is controlled by the monotonic ramp generator 11 or by the carrier recovery device 9 which serves the fast loop and adjusts the phase of the receiver oscillator LO (phase-locked loop).

Figure 2:
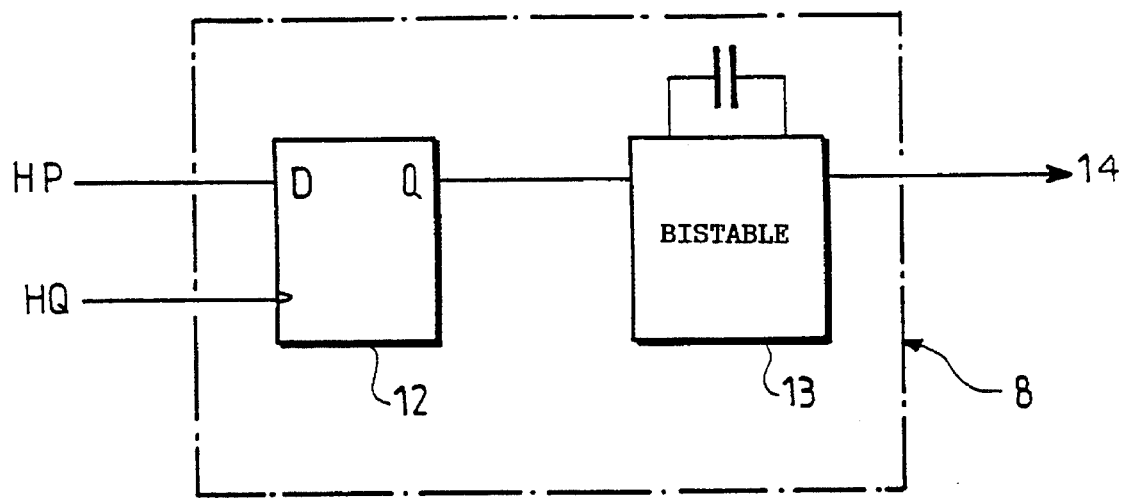
FIG. 2 is a schematic diagram of possible embodiment of a device for implementing the method of detecting false-locking in conformity with the invention.
Figure 3:
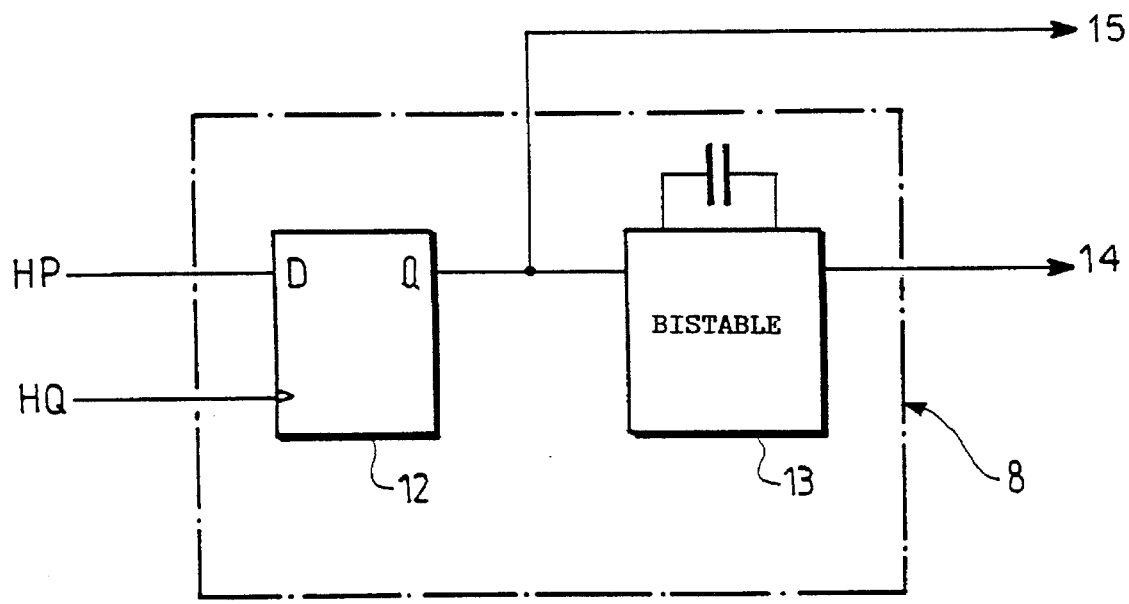
FIG. 3 is a schematic diagram of another possible embodiment of a device for implementing the method of detecting false-locking in conformity with the invention, this embodiment allowing the carrier phase to be established modulo $\pi$ in implementing the method of coherent demodulation of the invention.

Referring now to FIG. 2, one possible embodiment of the device 8 for detecting false-locking is shown. The device 8 comprises a D-type flip-flop 12 and a re-triggerable monostable 13, both triggered by rising edges for example. The input of the monostable 13 is connected to the output of the flip-flop 12. The flip-flop 12 receives the clock signal HP of the P channel on its D input and the clock signal HQ of the channel Q on its clock input. Another variant of the false-locking detection device is shown in FIG. 3 and is described below.

Figure 4A:
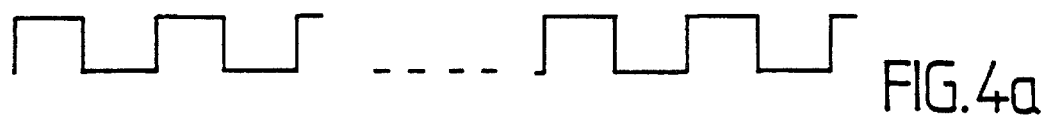
FIGS. 4a to 4d and 5a to 5c are schematic diagrams of input signals of various components of the device of FIG. 2 or FIG. 3, for correct locking and false-locking respectively.
Figure 4B:
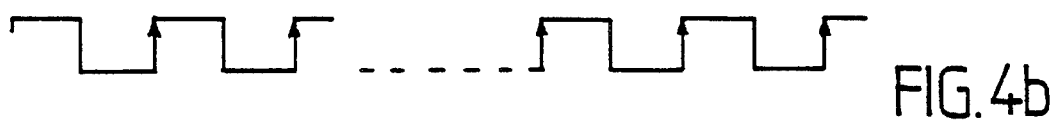
Figure 4C:
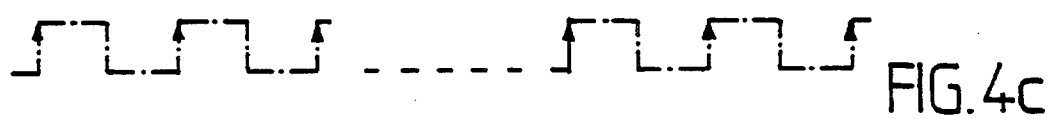
Figure 4D:
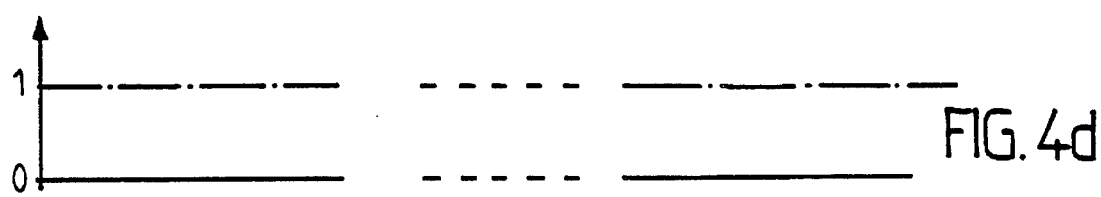

If the local oscillator LO is perfectly coherent, the clock signals HP and HQ of the channels P and Q are phase offset relative to one another by a constant phase offset. In FIG. 4a there is shown the signal HP and in FIGS. 4b and 4c the signal HQ in the two possible cases respectively of the phase offset relative to the signal HP; the signal HQ of FIG. 4b is delayed relative to the signal HP; the signal HQ of FIG. 4c is advanced relative to the signal HP. The signal at the Q output of the flip-flop 12 in FIG. 4d has been shown in full and chain-dotted lines respectively, depending on whether the signal HQ corresponds to that of FIG. 4b or that of FIG. 4c. At the rising edges of the channel Q clock (shown by the arrows in the diagrams) the clock signal of the P channel will be always 1 (chain-dotted line) or always 0 (full line). The Q output of the flip-flop 12 with thus always stay the same. The monostable 13 does not detect any rising edge and remains at level 0.

Figure 5A:
Figure 5B:
Figure 5C:
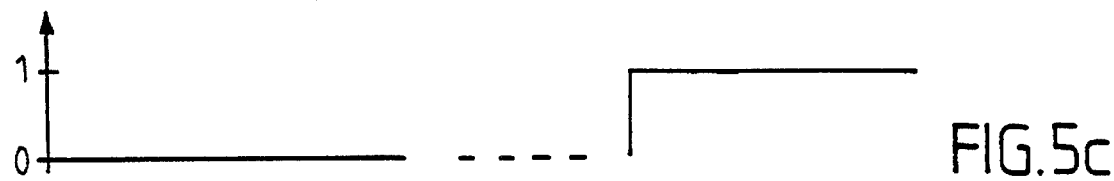

If, on the contrary, false-locking occurs, the system behaves in relation to the sampling time as if the carrier were phase shifting regularly. In the signal diagram, the constellation of binary signals displayed on an oscilloscope rotates round the reference grid. The delay between the clock trains HP and HQ of the two channels will not be constant and in particular it changes its sign. The signals HP and HQ are shown in FIGS. 5a and 5b respectively. At the rising edges of the clock HQ, the clock HP will thus be successively at one time at level 0, and at another at level 1. The Q output of the flip-flop 12 (FIG. 5c) will thus itself be successively at 0, then 1. The monostable 13 therefore receives a square-wave input signal. Given that the unstable state has been made long enough, the monostable 13 will necessarily be maintained at level 1 by the successive rising edges which it receives at its input, so long as false-locking persists.

Thus the device 8 provides a voltage 0 or a voltage 1, depending on whether correct locking or false-locking exists. This output voltage level of the device 8 controls the position of the switch 10.

Such a device 8 can be supplemented as is shown in FIG. 3 to allow the phase of the carrier to be established modulo $\pi$. The device 8 comprises a flip-flop 12 and a monostable 13 identical to those shown in FIG. 2. The signals at the D input and the clock input of the flip-flop 12 are also the clock trains HP and HQ respectively. The output voltage of the flip-flop 12 is applied not only to the monostable 13 but to a circuit for enabling the carrier recovery loop circuit 9. This circuit only enables the fast loop for carrier recovery when the clock train of the same channel is always in advance of the other clock train. Without the enabling circuit for the carrier recovery loop, the oscillator LO can lock on four axes in the complex plane phase offset by $\pi/2$ relative to one another, when the oscillator LO runs at the frequency of the transmitter oscillator. The phase ambiguity is $\pi/2$. With the enabling circuit for the carrier recovery loop, locking can only take place on two of the four possible locking axes. The carrier phase is thus established modulo $\pi$.

The invention has been described for the case of MDP4 modulation but obviously applies to any quadrature phase offset modulation with m states, where m is an integer greater than or equal to 4.

The references inserted in the claims following the technical features referred to have the sole object of facilitating comprehension of the claims and do not to limit them in any way.

What is claimed is:

1. A method of detecting false-locking of a reference signal onto a digitally quadrature modulated signal with multiple levels and phase offset and demodulated by coherent digital demodulation, said digitally quadrature modulated signal containing bit stream signals, said method comprising the steps of:

mixing said digitally quadrature modulated signal with a first reference signal and with a second reference signal which is in phase quadrature with the first reference signal, in order to obtain baseband analog signals corresponding to the bit stream signals, recovering, from said baseband analog signals, trains of clock signals which correspond to said bit stream signals;

monitoring the phase offset between said trains of clock signals;

detecting false-locking when the phase offset changes sign; and correcting the first and second reference signals, when false-locking is detected, to lock the first and second reference signals in frequency and phase with the digitally quadrature modulated signal.

2. A method of coherent digital demodulation of a signal which contains bit stream signals and which is initially digitally modulated with multiple levels and phase offset, said method comprising the steps of:

mixing said signal to be demodulated with a first reference signal and with a second reference signal which is in phase quadrature with the first reference signal, in order to obtain baseband analog signals corresponding to the bit stream signals, regenerating bit stream signals of the baseband analog signals thus obtained;

recovering, from said baseband analog signals, trains of clock signals which correspond to said bit stream signals;

monitoring the phase offset between said trains of clock signals;

detecting false-locking when the phase offset changes sign; and correcting the first and second reference signals, when false-locking is detected, to lock the first and second reference signals in frequency and phase with the signal to be demodulated.

3. The method of coherent digital demodulation according to claim 2, further comprising the step of detecting modulo $\pi$ the phase of the first reference signal when the direction of the phase offset between said trains of clock signals take a predetermined value.

4. The method of coherent digital demodulation according to claim 3, further comprising the step of:

correcting the first reference signal only when one of said trains of clock signals obtained by mixing the signal to be demodulated with the first reference signal is in advance relative to another of said trains of clock signals obtained by mixing the second reference signal with the signal to be demodulated, in such a manner that a phase to which the first reference signal is locked is established modulo $\pi$.

5. A device for detecting false-locking of a reference signal onto a digitally quadrature modulated signal with multiple levels in phase offset and demodulated by coherent digital demodulation, said device comprising:

a direct demodulation circuit for mixing the digitally quadrature modulated signal, said direct demodulation circuit comprising: a receiver oscillator providing a first reference signal; a first mixer for mixing the digitally quadrature modulated signal with the first reference signal and for providing a first baseband analog signal; and a second mixer for mixing the digitally quadrature modulated signal with a second reference signal which is in phase quadrature with the first reference signal and for providing a second baseband analog signal;

first and second clock recovery circuits for receiving the first and second baseband analog signals, respectively, and for recovering first and second trains of clock signals, respectively;

a detector adapted to detect changes in a direction of a phase offset between the first and second trains of clock signals; and a ramp generator coupled to said detector, which commands said receiver oscillator in order to correct said first and second reference signals to lock said first and second reference signals in frequency and phase with the digitally quadrature modulated signal, when said detector detects changes in the direction of the phase offset between the first and second trains of clock signals.

6. A device for detecting false-locking of a reference signal onto a digitally quadrature modulated signal with multiple levels in phase offset and demodulated by coherent digital demodulation, said device comprising:

a direct demodulation circuit for mixing the digitally quadrature modulated signal, said direct demodulation circuit comprising: a receiver oscillator providing a first reference signal; a first mixer for mixing the digitally quadrature modulated signal with the first reference signal and for providing a first baseband analog signal; and a second mixer for mixing the digitally quadrature modulated signal with a second reference signal which is in phase quadrature with the first reference signal and for providing a second baseband analog signal;

first and second clock recovery circuits for receiving the first and second baseband analog signals, respectively, and for recovering first and second trains of clock signals, respectively;

a detector adapted to detect changes in a direction of a phase offset between the first and second trains of clock signals, wherein said detector comprises: a flip-flop receiving the second train of clock signals on its clock input and receiving the first train of clock signals on another input, to produce an output signal; and a monostable circuit receiving the output signal of said flip-flop; and a ramp generator coupled to said detector, which commands said receiver oscillator in order to correct said first and second reference signals to lock said first and second reference signals in frequency and phase with the digitally quadrature modulated signal, when said detector detects changes in the direction of the phase-offset between the first and second trains of clock signals.

7. The device according to claim 6, wherein said flip-flop is a D-type flip-flop.

8. A device for performing coherent digital demodulation of a signal to be demodulated which contains bit stream signals and which has been modulated with multiple levels and phase offset, said device comprising:

a direct demodulation circuit for mixing the signal to be demodulated, said direct demodulation circuit comprising: a receiver oscillator providing a first reference signal; a first mixer for mixing the signal to be demodulated with the first reference signal and for providing a first baseband analog signal; and a second mixer for mixing the signal to be demodulated with a second reference signal which is in phase quadrature with the first reference signal and for providing a second baseband analog signal, said first and second baseband analog signals corresponding to the bit stream signals;

first and second clock recovery circuits for receiving the first and second baseband analog signals, respectively, and for recovering first and second trains of clock signals, respectively;

first and second regenerating samplers for receiving the first and second baseband analog signals, respectively, and the first and second trains of clock signals, respectively, and for regenerating bit streams of the first and second baseband analog signals, respectively;

a false-locking detector device comprising a flip-flop receiving the second train of clock signals on its clock input and receiving the first train of clock signals on another input, to produce an output signal; and a monostable circuit receiving the output signal of said flip-flop;

a carrier recovery circuit for receiving the regenerated bit streams of the first and second baseband analog signals and for generating an output signal which controls a phase of the receiver oscillator; and a voltage ramp circuit for generating an output signal which controls a frequency of the receiver oscillator based on an output signal from said monostable circuit and the output signal from the carrier recovery circuit.

* * * * *